United States Patent
Hsu et al.

(10) Patent No.: US 9,232,560 B2
(45) Date of Patent: Jan. 5, 2016

(54) MOBILE WIDE AREA NETWORK IP TRANSLATION CONFIGURATION

(75) Inventors: Wei-Lun Hsu, Hsinchu (TW); Pen Hsieh, Andover, MA (US); Chia-Hung Fan, Hsinchu (TW); Chen-Hua Fan, Taichung (TW)

(73) Assignee: OPEN INVENTION NETWORK, LLC, Dallas, TX (US)

( * ) Notice: Subject to any disclaimer, the term of this patent is extended or adjusted under 35 U.S.C. 154(b) by 107 days.

(21) Appl. No.: 13/592,061

(22) Filed: Aug. 22, 2012

(65) Prior Publication Data

US 2013/0215825 A1 Aug. 22, 2013

Related U.S. Application Data

(60) Provisional application No. 61/527,673, filed on Aug. 26, 2011.

(51) Int. Cl.
*H04W 88/06* (2009.01)
*H04W 80/04* (2009.01)
*H04L 29/06* (2006.01)

(52) U.S. Cl.
CPC ............. *H04W 88/06* (2013.01); *H04L 69/167* (2013.01); *H04W 80/045* (2013.01)

(58) Field of Classification Search
CPC ... H04W 12/00; H04W 12/08; H04W 28/021; H04W 84/18; H04W 47/17; H04W 47/18; H04W 47/20; H04W 80/00; H04W 80/045; H04W 88/06; H04L 61/256; H04L 69/167

USPC ................ 370/252, 254, 338–339, 235, 352, 370/312–313, 389, 392, 328, 400–401, 370/465–467; 455/422.1, 442; 709/222, 709/245

See application file for complete search history.

(56) References Cited

U.S. PATENT DOCUMENTS

| | | | | |
|---|---|---|---|---|
| 6,240,533 B1 * | 5/2001 | Slemmer | | 714/48 |
| 6,781,979 B1 * | 8/2004 | Ebata et al. | | 370/338 |
| 6,854,063 B1 * | 2/2005 | Qu et al. | | 726/13 |
| 7,245,917 B2 * | 7/2007 | Chiueh | | 455/442 |
| 7,882,224 B2 | 2/2011 | Gaudio et al. | | |
| 8,023,432 B2 * | 9/2011 | Herzog | | 370/254 |
| 8,190,767 B1 * | 5/2012 | Maufer et al. | | 709/238 |
| 8,320,902 B2 * | 11/2012 | Moring et al. | | 455/422.1 |
| 8,339,959 B1 * | 12/2012 | Moisand et al. | | 370/235 |
| 2003/0147421 A1 | 8/2003 | Gutknecht et al. | | |
| 2004/0073704 A1 * | 4/2004 | Paunikar et al. | | 709/245 |
| 2007/0058567 A1 | 3/2007 | Harrington et al. | | |
| 2009/0180474 A1 * | 7/2009 | Liu | | 370/392 |
| 2011/0035479 A1 * | 2/2011 | Paunikar et al. | | 709/222 |

* cited by examiner

*Primary Examiner* — Charles C Jiang
*Assistant Examiner* — Mohamed Kamara

(57) ABSTRACT

A method, system and non-transitory computer storage readable medium comprise operating a Wide Area Network (WAN) device according to a first Internet protocol (IP) translation mode of operation, changing an initial connectivity status between the WAN device and a WAN and transitioning from the first IP translation mode of operation to a second IP translation mode of operation that is different from the first IP translation mode of operation based on the change in the initial connectivity status.

14 Claims, 5 Drawing Sheets

US 9,232,560 B2

MOBILE WIDE AREA NETWORK IP TRANSLATION CONFIGURATION

CROSS REFERENCE TO RELATED APPLICATIONS

This application claims priority to U.S. provisional patent application Ser. No. 61/527,673 entitled A MOBILE WAN DEVICE, filed on Aug. 26, 2011, the disclosure of which is incorporated in its entirety herein by reference.

TECHNICAL FIELD

This invention relates to wireless mobile broadband. More particularly, the invention is directed to wireless mobile wide area network (WAN) devices that are connected to or attached to computers and allow wireless access to a telecommunications network that provides service to a broad area, including a private network for accessing the Internet.

BACKGROUND OF THE INVENTION

Wide area network (WAN) devices include, but are not limited to, routers and gateways, which can be used to connect multiple computers to a WAN, and universal serial bus (USB) adapters (i.e., "USB dongles"), which are attached to computers via USB ports and are typically used to connect a single computer to a WAN.

Broadband access via wireless networks (e.g., code division multiple access (CDMA), universal mobile telecommunications systems (UMTS), wideband (W)-CDMA, long term evolution (LTE), and worldwide interoperability for microwave access (Wi-Max), etc.) provide the capabilities of mobility for use with portable notebook computers and handheld devices, but bear the disadvantages of a higher rate of loss of wireless signal and Internet connectivity as compared to fixed-line networks.

In operation, when a computer executes a software to communicate with a remote party on the network (e.g., uses web browser software to communicate with a web server on the Internet), data traffic (e.g., Internet Protocol or "IP" traffic) is sent back and forth packaged with source and destination IP addresses in the header of each data packet.

In conventional networks, it is common practice to hide entire Internet Protocol (IP) addresses of a local area network (LAN), which usually includes a pool of private IP addresses shared by multiple computers, behind a single typically public IP address owned and/or used by a router. In operation, the route may route data traffic back and forth between the computers and the Internet. The router has a dynamic host configuration protocol (DHCP) server that manages the pool of private IP addresses, assigning them to end user devices as requested, and taking them back from the end-user devices when the addresses are no longer needed and returning them the pool. The amount of time a private IP address is assigned to a computer is called the "lease time."

Extending the lease time for each computer requires a series of communication signals being sent back and forth with the DHCP server in the WAN device. In conventional WAN networks, in which the WAN device may direct data traffic for a large number of devices, the lease time is typically set at a long time interval of a day or more to reduce the volume of such communication signals being transferred back and forth. In common practice, Internet servers, for example, that host a given requested website never receive the private IP address of a given end-user computer. In fact, they only receive the public IP address of the WAN device through which the computer's request is routed. This IP mapping or transition process is typically accomplished by modifying the IP address information in IP data packets while in transit across a WAN device, such as a router. This process is generally referred to as network address translation (NAT). The privately originated IP address in the header of the end-user computer's request is "translated" into the publicly originated IP address of the router itself for routing or use across the Internet.

Some web-based software, however, does not function reliably or sometimes at all when NAT is applied, and may require a public IP address to function properly. A widespread solution to this problem is to implement a different IP translation operation known as "IP pass-through", which entails both the sharing of the public IP address of the WAN device with a separate computer and the forwarding of all incoming traffic without modification from an incoming port on the public WAN-side of the router to an outgoing port on its private LAN-side connected to the computer (and vice-versa). This effectively allows each end-user device operating on the LAN to use the router's public IP address as the computer device's own IP address, without undergoing a NAT. The origination IP address in the header of data packets sent from the computer that is "behind" a WAN device, such as the router, operating in IP pass-through mode will be the same as the shared public IP address of the WAN device.

A problem with the user of IP pass-through, however, is that the management of the WAN device may be precluded from an end-user computer. Device management is necessary to manage a WAN device's status, diagnose problems and handle customer complaints. For device management to be possible, the WAN device and computer must be capable of direct communication with each other, which requires the WAN device to have its own private IP address separate from that of the computer on the LAN side. If IP pass-through is in being used and the WAN device and computer share a same IP address, then no device management communications are sent back and forth between the computer and the WAN device. The destination IP address of the device management data sent by the computer intended for the WAN device is identical to the "passed-through" IP address of the computer itself, and thus no IP traffic ever leaves the computer. In addition, in order for device management to be possible using continuous IP pass-through as it is conventionally used, the device management software must be installed directly on the computer, and the communications between the computer and the WAN device must be transmitted via a special channel other than a network interface. This burdensome configuration is called a "hosted" solution, because the solution must be run on the host computer.

Similarly, for an Internet service provider (ISP) operator to manage the WAN device from a network management server, the device and the server must also be able to directly communicate with each other. In this case, the IP traffic for device management must be received and processed by the WAN device itself. If IP pass-through is being used and all such device management IP traffic sent by the network management server is forwarded by the WAN device to the end-user computer, then the ISP operator cannot manage the WAN device. Specialized device management software tools may used to intercept the device management traffic by the WAN device and allow the management of the WAN device by operators even while IP pass-through mode is operating.

An additional problem with the above-described IP pass-through operation in the mobile WAN context arises from the fact that, wireless networks inherently suffer from a higher rate of loss of wireless signal and Internet connectivity, in general. When a WAN device loses connectivity with the Internet, the end-user computer's "passed-through" IP address becomes ineligible to be used for Internet communication purposes. The computer, however, does not recognize that the WAN access and the computer itself have been disconnected. As a result, the computer will continues to send its data traffic to the network through the WAN device, but that traffic is no longer passed-through to the intended website server, and will typically be dropped (i.e., lost).

Another problem is that any detour capabilities a computer with multiple network interfaces might normally have to route IP traffic from a lost or slower interface to a faster interface will also be impaired as a result of the loss in the WAN connectivity. This results in a significant slow down and/or interruption for the computer's WAN connectivity, and thus significantly lowers the quality of a wireless mobile device user's Internet session.

SUMMARY

One example embodiment of the present invention may include a method that may include operating a WAN device according to a first Internet protocol (IP) translation mode of operation and changing an initial connectivity status between the WAN device and the WAN. The method may also include transitioning from the first IP translation mode of operation to a second IP translation mode of operation that is different from the first IP translation mode of operation based on the change in the initial connectivity status.

Another example embodiment of the present invention may include a device that may include a processor configured to operate according to a first Internet protocol (IP) translation mode of operation, change an initial connectivity status with a WAN, and transition from the first IP translation mode of operation to a second IP translation mode of operation that is different from the first IP translation mode of operation based on the change in the initial connectivity status. The apparatus may also include a network interface card configured to provide WAN connectivity to at least one peripheral computer device, wherein the processor and the network interface card are communicably coupled.

A further example embodiment of the present invention may include a non-transitory computer readable storage medium configured to store instructions that when executed cause a processor to perform operating a WAN device according to a first Internet protocol (IP) translation mode of operation, changing an initial connectivity status between the WAN device and the WAN, and transitioning from the first IP translation mode of operation to a second IP translation mode of operation that is different from the first IP translation mode of operation based on the change in the initial connectivity status.

DETAILED DESCRIPTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention include a "host-less" configuration that is embedded in a WAN device and does not require the installation of software on a network computer device that may communicate with the WAN device. Such a host-less configuration would generally be applied to any type of wireless technology (e.g., 3G, 4G, Wi-Fi etc.), and any type of host computer (e.g. PC, MAC, etc.) and its corresponding operating system (e.g., WINDOWS, OSX, LINUX, etc.).

Figure 1A:
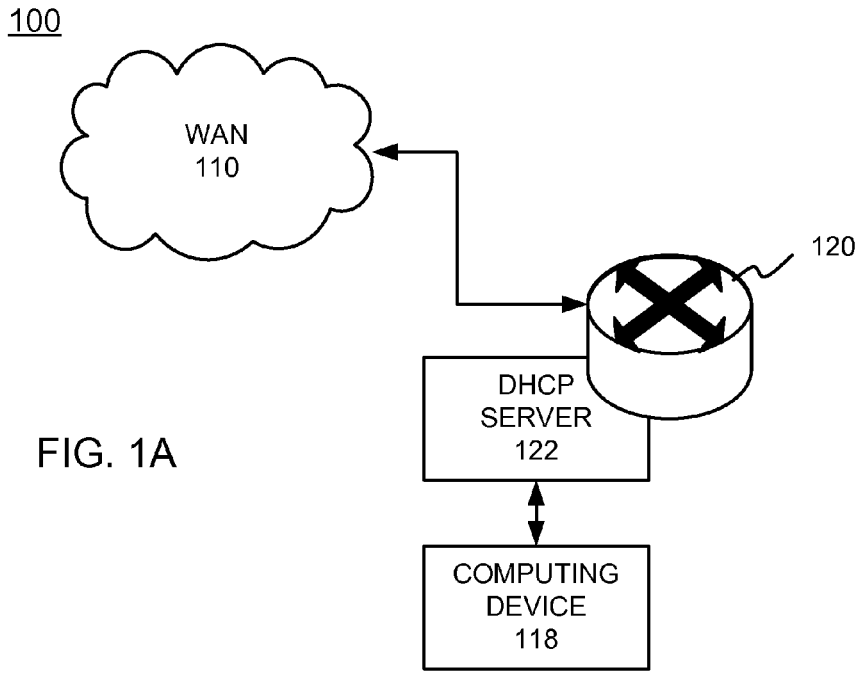
FIG. 1A illustrates an example of a wide area network (WAN) configuration with a router WAN device.

FIG. 1A illustrates an example network configuration 100 according to example embodiments. Referring to FIG. 1A, a WAN 110 may include a large-scale network with Internet access and device management functions that are regulated by a router or gateway 120 that routes IP data message traffic to and from devices seeking access to the WAN 110. For example, a computing device 118 may be a computer that is assigned an IP address from a DHCP server function 122 that is embedded in the router 120. In another example, the WAN device may be a USB dongle that is attached to a computing device and which provides wireless network access to other devices via a wireless communication signaling protocol (i.e., BLUETOOTH®).

A mobile wide area network (WAN) device's communication signaling may include operating under an initial mode of operation and then transitioning to a different mode of operation when a WAN connectivity status is changed. For example, the WAN device may be processing incoming and/ or outgoing data traffic under a network address translation (NAT) mode of operation and then transitioning to an IP pass-through mode of operation when WAN connectivity is established. The WAN device may then transition from the IP pass-through mode of operation back to the NAT mode of operation when WAN connectivity is lost. The mobile WAN device (e.g., a USB dongle) may own a fixed private IP address so that the computer to which the mobile WAN device is attached can always access and manage the device independent of its connectivity to the WAN (i.e., whether or not WAN connection is established or lost), and also during the WAN device's IP pass-through mode.

The lease times of the private or public IP addresses assigned by or 'passed through' from the WAN device to the computer in both modes respectively may be programmed to be a short period of time, which expedites the transition between the two different modes of IP traffic management. The lease time configuration combined with a transition back to the NAT mode, upon the loss of WAN connectivity, expedites the computer's recognition that the WAN device, and in turn, the corresponding computer's own connectivity to the WAN have been lost. This configuration will essentially preserve the detour capabilities a computer with multiple network interfaces might have for routing IP traffic from an interface suffering from a lost or slower connection to another interface that has WAN connectivity. As a result, the quality and continuous connectivity of a wireless mobile user's Internet session will increase.

Figure 1B:
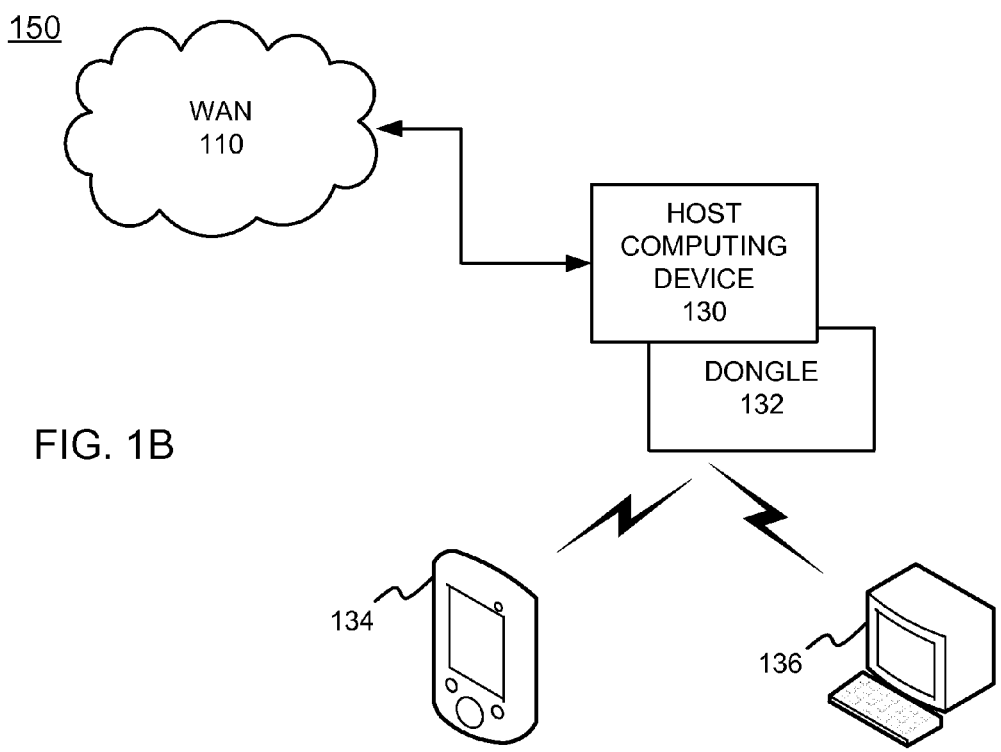
FIG. 1B illustrates an example of a wide area network (WAN) configuration with a dongle WAN device.

FIG. 1B illustrates another network configuration 150 according to example embodiments. Referring to FIG. 1B, the mobile WAN device may be a wireless communication device (e.g., a USB dongle) that is assigned or owns a fixed private IP address. In this example, the host computing device 130 may be a device in communication with the WAN 110 and the dongle 132 may be connected to the computing device to provide a peripheral network device, such as a mobile handheld device 134 or a computer device 136 with wireless access to the WAN and/or the Internet. In this configuration, the computer 130 to which the mobile WAN device 132 is attached can always access and manage the device 132 independent of its connectivity to the WAN. For example, whether or not a WAN connection is established or lost, and also during the WAN device's IP pass-through mode which is described in greater detail below with respect to FIG. 2.

Figure 2:
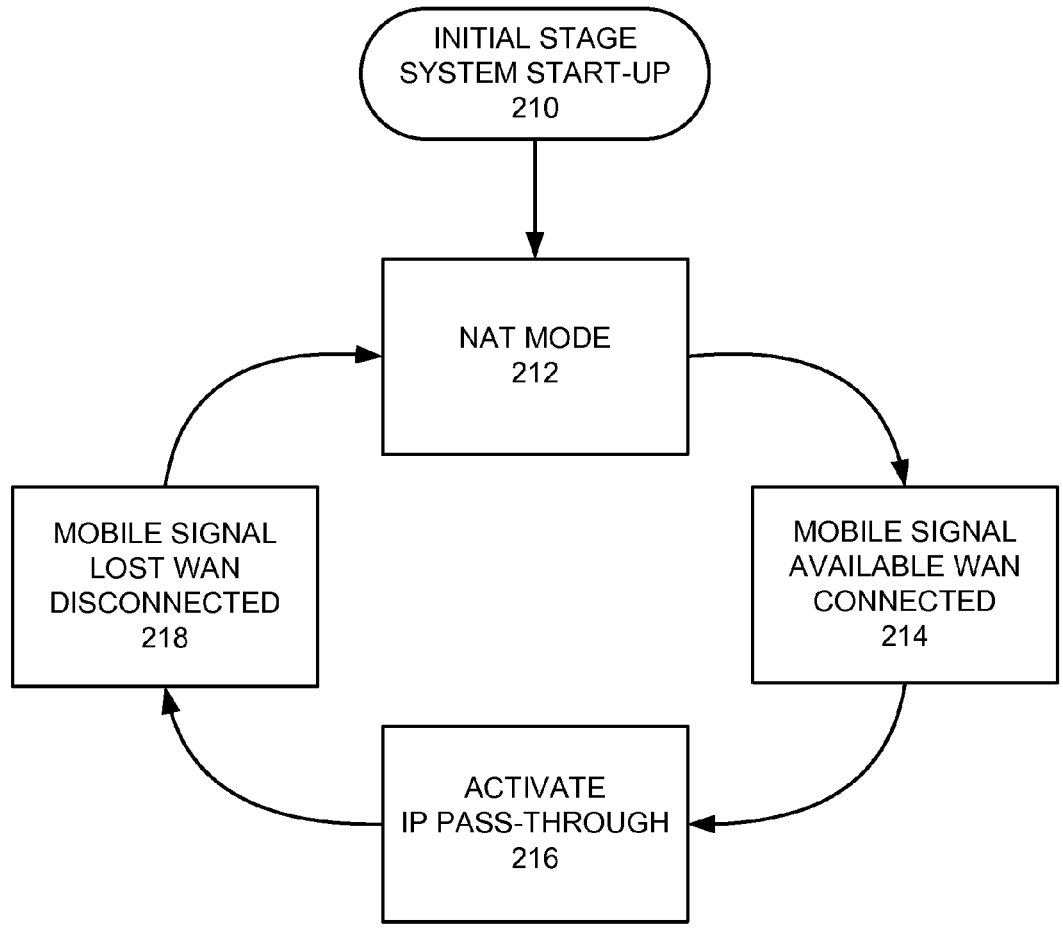
FIG. 2 illustrates an example system logic flow diagram of a dynamic WAN device configuration.

Referring to FIG. 2, when the mobile signal and WAN connection are not yet established, such as during power up of the computer and/or the mobile WAN device "initial stage system start-up" 210, the mobile WAN device is configured to being operating under a NAT mode of operation 212 for handling data traffic. Referring still to FIG. 2, the logic diagram 200 includes a status change function for a mode of operation of a mobile WAN device's communications including a transition from a NAT mode 212 to an IP pass-through mode 216 when WAN connectivity is established 214, and a transition from the IP pass-through mode 216 to the NAT mode 212 when WAN connectivity is lost 218. The WAN device (e.g., router 120, gateway, USB dongle 132, etc.) may have an embedded DHCP server 122 that assigns a private IP address to the computers or communication devices which are utilizing the WAN device to access the data communications network and/or the Internet.

According to one example, the lease time of the private IP address is programmed to be shorter than the day(s) long lease times that computers are typically assigned in the conventional WAN network environment. Lease renewal requests are made under DHCP as a fraction of a normal lease time (e.g., half a normal lease time, a quarter of a normal lease time, etc.). For example, given an exemplary lease time of one minute, the network computing device 118/134/136 may transmit a request to the mobile WAN device 120/132 for permission to extend the private IP address lease time every 30 seconds while operating in NAT mode. In the absence of a WAN connection, the WAN device 120/132 may accept such a renewal request and extend the lease another minute(s).

When the mobile signal becomes available and a WAN connection is achieved ("mobile signal available—WAN connected"), the WAN device transitions from NAT mode to IP pass-through mode ("activate IP pass-through"). With the establishment of a WAN connection, the mobile WAN device 132 is typically assigned a public IP address by an ISP DHCP server. The above-described short lease time facilitates this transition for the WAN device 132 from NAT mode to IP pass-through mode. Since the computer devices 134/136 relying on the WAN device 132 may transmit renewal request messages for the originally assigned private IP address every 30 seconds, a renewal request will be performed at most within 30 seconds of the establishment of a WAN connection.

When receiving such a renewal IP request after WAN connection is established, the WAN device 120/132 is configured to reject this request and start IP pass-through mode which includes both assigning its newly acquired public IP address to the host computer and also forwarding all IP traffic to the host computer. The assignment of this public IP address to the host computer is itself programmed to have a short lease time, paralleling the short lease time of the private IP address assigned by the WAN device to the host computer at the start of NAT mode as described above.

The WAN device also has a separate fixed private IP address for local device management purposes, and the host computer is always able to manage the device even during IP pass-through mode and also when a wireless signal and/or WAN connectivity is lost. An ISP operator, however, has no knowledge of the WAN device's fixed private IP address. As a result, for device management by an ISP operator or anyone else on the WAN when the WAN device is in IP pass-through mode, any IP device management traffic must be intercepted by and processed by the WAN device itself. This is achieved by using certain software application tools which allow the interception of such device management traffic by the WAN device and thus allow the management of the WAN device by operators even while IP pass-through mode is operating.

When the mobile signal and the WAN connection is lost ("mobile signal lost—WAN disconnected"), which happens more frequently in the mobile WAN device context than in the conventional WAN device context, then the mobile WAN device is programmed to return to a NAT mode of operation. The return to NAT mode is facilitated by the short lease time, as the renewal request of the computer for the WAN device's public IP lease occurs in the first 30 seconds of WAN disconnection. The WAN device may be configured to return to NAT mode when its renewal request is rejected due to a now illegal public IP address. When NAT mode is again initiated, the DHCP server 122 assigns a new private IP address to the host computer 130 which restarts the entire cycle of IP device management.

The transitioning of the WAN device 120/132 from NAT mode to IP pass-through mode when WAN connection is established allows the use of certain web-based software that does not operate in NAT mode during the periods of WAN connection when the web-based software is accessible. A WAN that operates solely in NAT mode has limited capabilities. The transitioning of the WAN device 120/132 from IP pass-through mode back to NAT mode when WAN connection is established provides flexibility for the devices which rely on the WAN device for network access. The assignment of a short lease time from a pass-through mode operating WAN device to the host computer combines to preserve the availability of any detour capabilities a computer with multiple network interfaces might have for routing IP traffic from an interface suffering from a lost or slower connection to another interface that actually has WAN connectivity.

A computer or computing device 118/134/136 operating behind a WAN device 120/132 that works solely in IP pass-through mode is slower to identify when the WAN device and its corresponding own WAN connectivity is lost. As a result, the computing device is also slower to detour its IP traffic to another interface that has WAN connectivity. The foregoing exemplary embodiments illustrated in FIGS. 1A, 1B and 2 and discussed above are merely illustrative of the principles of the invention(s). A person of ordinary skill in the art will be able to devise numerous arrangements, which, although not explicitly shown or described herein, including but not limited to modifying the start point and/or the sequence of the transitions between modes (e.g. starting in IP pass-through mode on power-up), using an end-user device other than a computer (e.g. handheld devices), using communication protocols other than IP, and using WAN devices other than those external to the end-user device (e.g. embedded WAN devices), nevertheless embody those principles and are within the spirit and scope of the invention.

Figure 3:
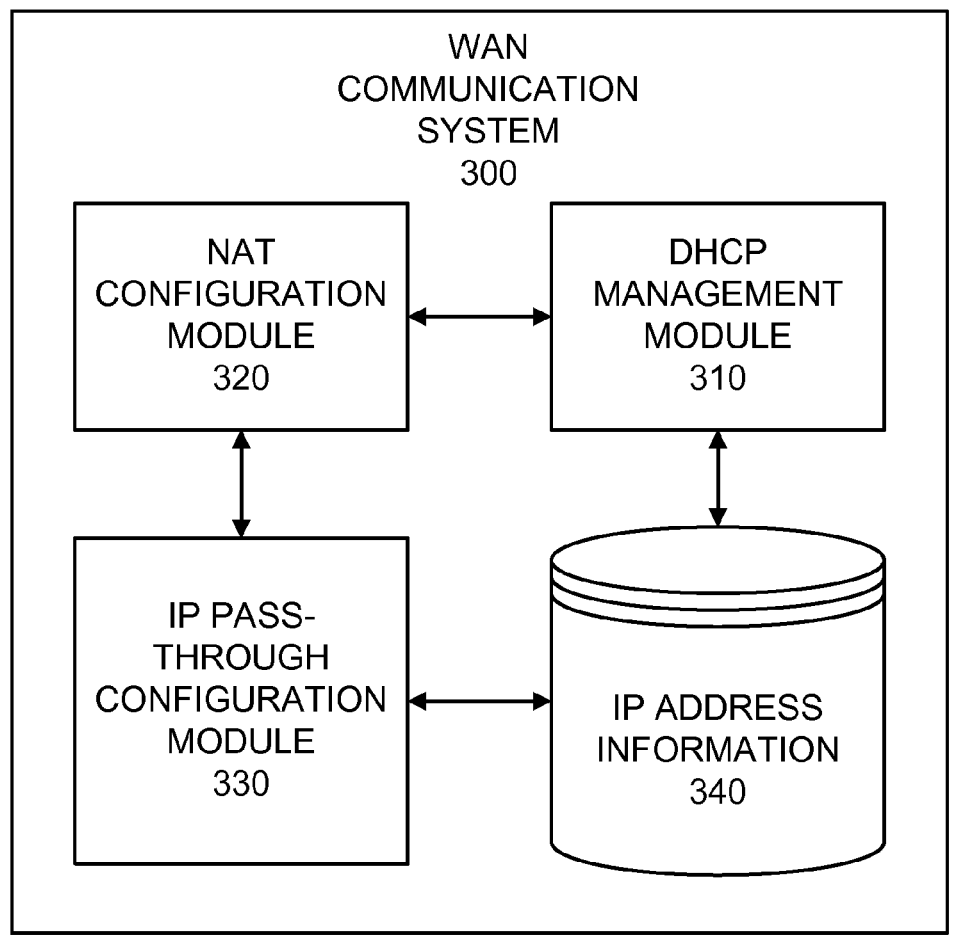
FIG. 3 illustrates an example WAN communication system configured to operate according to any of the example embodiments.

FIG. 3 illustrates an example WAN communication system configuration according to example embodiments. The system 300 includes several modules or processing units configure to execute one or more operations or tasks. The system 300 includes, for example, an IP address information databank 340 which maintains the necessary IP routing tables, address configuration lists, subnets, subnet masks, etc., necessary to delegate internal/private IP addresses to computing devices seeking access to the WAN or Internet via the system 300. The system may also include a DHCP management module 310 for distributing IP addresses and other related device management information, a NAT configuration module 320 for processing IP management procedures according to the NAT protocol, and an IP pass-through configuration module 330 for processing IP management procedures according to the IP pass-through protocol. The system 300 may be a single computing device or server, or may include multiple computing devices depending on the network configuration preferences.

According to one example method of operation, a wide area network (WAN) device may be in communication with a WAN and may include operating the WAN device according to a first Internet protocol (IP) translation mode of operation. The first mode may be the NAT mode operated by the NAT module 320 or the IP pass-through mode operated by the IP pass-through module 330. The method may also include changing an initial connectivity status between the WAN device and the WAN, the connectivity status may begin as connected or disconnected and change to connected to disconnected provided that the initial status is changed from one to the other. The method may also include transitioning from the first IP translation mode of operation to a second IP translation mode of operation that is different from the first IP mode translation of operation based on the change in the initial connectivity status. For example, the NAT configuration module 320 may be processing incoming and outgoing IP packets according to the NAT protocol for processing IP headers and related IP messaging. Once the change is detected in the connectivity status, the NAT configuration module 320 and the IP pass-through module 330 may change roles as one is operating actively and the other passively until the change in the WAN connectivity status is detected.

According to one example, the initial connectivity status is a WAN connected status indicating an active session or connection between the WAN device or system and the WAN network. The initial connectivity status may instead by a WAN not connected status. The transitioning from the first IP translation mode of operation to the second IP translation mode of operation may occur when a connection to the WAN is lost and the initial connectivity status to the WAN is connected. However, the transitioning from the first IP translation mode of operation to the second IP translation mode of operation may instead occur when a connection to the WAN is obtained and the initial connectivity status of the WAN is not connected. Additionally, the method may also include transitioning from the second IP translation mode of operation back to the first IP translation mode of operation when the initial connectivity status is restored. The first IP translation mode of operation may be a network access translation (NAT) mode of operation or the first IP translation mode of operation may instead by an IP pass-through mode of operation.

The example method of operation may further include transitioning from the first IP translation mode of operation to the second IP translation mode of operation by transitioning from a network access translation (NAT) mode of operation to an IP pass-through mode of operation, which occurs when WAN connectivity is established. Alternatively, the transitioning from the first IP translation mode of operation to the second IP translation mode of operation may include transitioning from an IP pass-through mode of operation to a network access translation (NAT) mode of operation when WAN connectivity is lost.

Another example embodiment may include a WAN device configured to operate on a Wide Area Network (WAN), the WAN device may include a processor configured to operate according to a first Internet protocol (IP) translation mode of operation, and to change an initial connectivity status with the WAN, and transition from the first IP translation mode of operation to a second IP translation mode of operation that is different from the first IP mode translation of operation based on the change in the initial connectivity status. The WAN device may also include a transmitter/receiver pair to establish and relay communications to and from other devices operating on the WAN, such as a network interface card configured to provide WAN connectivity to at least one peripheral computer device in communication with the network interface card. The WAN device may include multiple network cards which may be enabled to provide additional communication routes when one or more of the other network cards fail or WAN connectivity cannot be established by a present network card and another needs to be enabled.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 4:
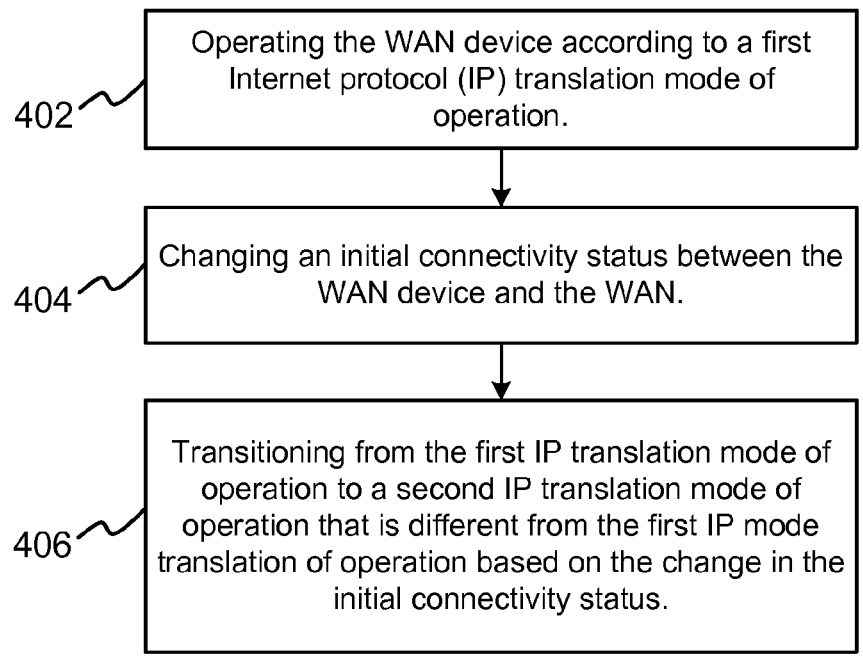
FIG. 4 illustrates a flow diagram of an example method of operation.

FIG. 4 illustrates an example flow diagram 400 of an example method of operation according to example embodiments. Referring to FIG. 4, an example method of operating a Wide Area Network (WAN) device in communication with a WAN is disclosed. The method may include operating the WAN device according to a first Internet protocol (IP) translation mode of operation at operation 402 and changing an initial connectivity status between the WAN device and the WAN at operation 404. The method may also include transitioning from the first IP translation mode of operation to a second IP translation mode of operation that is different from the first IP mode translation of operation based on the change in the initial connectivity status at operation 406.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components of the other figures.

Figure 5:
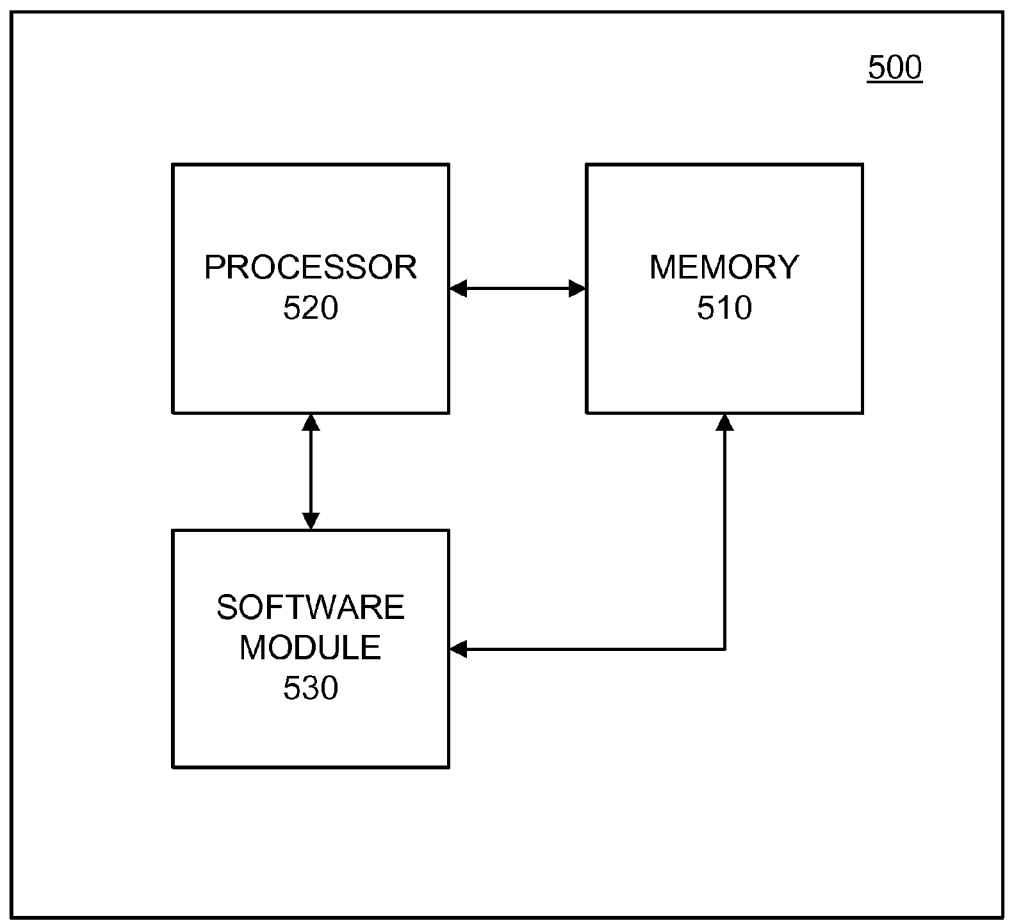
FIG. 5 illustrates a network entity that may include memory, software code and other computer processing hardware used to perform various operations according to example embodiments.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and non-transitory computer readable medium of the present application has been illustrated in the accompanied drawings and described in the foregoing detailed description, it will be understood that the present invention is not limited to the embodiments disclosed, but is capable of numerous rearrangements, modifications, and substitutions without departing from the spirit or scope of the invention as set forth and defined by the following claims. For example, the capabilities of the system illustrated in FIG. 3 may be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   operating a Wide Area Network (WAN) device according to a first Internet protocol (IP) translation mode of operation that determines how the IP address information of IP data packets are modified in transit across the WAN device;
   changing an initial connectivity status between the WAN device and a WAN;
   transitioning from the first IP translation mode of operation to a second IP translation mode of operation that is different from the first IP translation mode of operation based on the change in the initial connectivity status;
   wherein transitioning from the first IP translation mode of operation to the second IP translation mode of operation comprises transitioning from a network access translation (NAT) mode of operation to an IP pass-through mode of operation which occurs when WAN connectivity is established.

2. The method of claim 1, wherein the initial connectivity status is a WAN connected status.

3. The method of claim 1, wherein the initial connectivity status is a WAN not connected status.

4. The method of claim 1, wherein transitioning from the first IP translation mode of operation to the second IP translation mode of operation occurs when a connection to the WAN is lost and the initial connectivity status to the WAN is connected.

5. The method of claim 1, wherein transitioning from the first IP translation mode of operation to the second IP translation mode of operation occurs when a connection to the WAN is obtained and the initial connectivity status of the WAN is not connected.

6. The method of claim 1, further comprising transitioning from the second IP translation mode of operation back to the first IP translation mode of operation when the initial connectivity status is restored.

7. The method of claim 1, wherein transitioning from the first IP translation mode of operation to the second IP translation mode of operation comprises transitioning from an IP pass-through mode of operation to a network access translation (NAT) mode of operation when WAN connectivity is lost.

8. A device, comprising:
   a processor configured to:
      operate according to a first Internet protocol (IP) translation mode of operation that determines how the IP address information of IP data packets are modified in transit across the WAN device,
      change an initial connectivity status with a Wide Area Network (WAN); and
      transition from the first IP translation mode of operation to a second IP translation mode of operation that is different from the first IP translation mode of operation based on the change in the initial connectivity status; and
   a network interface card configured to provide WAN connectivity to at least one peripheral computer device, wherein the processor and the network interface card are communicably coupled;
   wherein the transition from the first IP translation mode of operation to the second IP translation mode of operation comprises at least one of a transition from a network access translation (NAT) mode of operation to an IP pass-through mode of operation which occurs when WAN connectivity is established and a transition from an IP pass-through mode of operation to a network access translation (NAT) mode of operation when WAN connectivity is lost.

9. The device of claim 8, wherein the initial connectivity status is a WAN connected status.

10. The device of claim 8, wherein the initial connectivity status is a WAN not connected status.

11. The device of claim 8, wherein the transition from the first IP translation mode of operation to the second IP translation mode of operation occurs when a connection to the WAN is lost and the initial connectivity status to the WAN is connected.

12. The device of claim 8, wherein the transition from the first IP translation mode of operation to the second IP translation mode of operation occurs when a connection to the WAN is obtained and the initial connectivity status of the WAN is not connected.

13. The device of claim 8, wherein the processor is further configured to transition back from the second IP translation mode of operation back to the first IP translation mode of operation when the initial connectivity status is restored.

14. A non-transitory computer readable storage medium configured to store instructions that when executed cause a processor to perform:

operating a Wide Area Network (WAN) device according to a first Internet protocol (IP) translation mode of operation that determines how the IP address information of IP data packets are modified in transit across the WAN device;

changing an initial connectivity status between the WAN device and a WAN; and transitioning from the first IP translation mode of operation to a second IP translation mode of operation that is different from the first IP translation mode of operation based on the change in the initial connectivity status;

wherein transitioning from the first IP translation mode of operation to the second IP translation mode of operation comprises transitioning from a network access translation (NAT) mode of operation to an IP pass-through mode of operation which occurs when WAN connectivity is established.

* * * * *